US012679315B2

(12) United States Patent
Laender et al.

(10) Patent No.: US 12,679,315 B2
(45) Date of Patent: Jul. 14, 2026

(54) CONTROL DEVICE AND METHOD FOR OPERATING AN EMERGENCY BRAKING ASSISTANT FOR A MOTOR VEHICLE

(71) Applicant: Bayerische Motoren Werke Aktiengesellschaft, Munich (DE)

(72) Inventors: Simon Laender, Germering (DE); Sebastian Bruckner, Bobingen (DE); Andre Dux, Polling (DE); Sebastian Kaps, Unterbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/660,330

(22) Filed: May 10, 2024

(65) Prior Publication Data

US 2024/0375621 A1 Nov. 14, 2024

(30) Foreign Application Priority Data

May 12, 2023 (DE) ..................... 10 2023 112 655.5

(51) Int. Cl.
*B60T 7/22* (2006.01)

(52) U.S. Cl.
CPC ........... *B60T 7/22* (2013.01); *B60T 2201/024* (2013.01)

(58) Field of Classification Search
CPC .............................. B60T 2201/024; B60T 7/22
See application file for complete search history.

(56) References Cited

U.S. PATENT DOCUMENTS

| | | | |
|---|---|---|---|
| 10,384,629 B2 * | 8/2019 | Ohmori | B60W 30/18163 |
| 11,891,092 B2 * | 2/2024 | Kuemmel | B60W 60/00186 |
| 2001/0027372 A1 * | 10/2001 | Hellmann | B60K 31/0008 |
| | | | 180/170 |
| 2008/0234907 A1 | 9/2008 | Labuhn et al. | |
| 2009/0204296 A1 | 8/2009 | Lich et al. | |

(Continued)

FOREIGN PATENT DOCUMENTS

| | | |
|---|---|---|
| DE | 10 2006 036 218 A1 | 10/2007 |
| DE | 10 2008 014 315 A1 | 10/2008 |

(Continued)

OTHER PUBLICATIONS

German-language Search Report issued in German Application No. 10 2023 112 655.5 dated Jan. 10, 2024 with partial English translation (11 pages).

*Primary Examiner* — Carl C Staubach
(74) *Attorney, Agent, or Firm* — Crowell & Moring LLP

(57) ABSTRACT

Methods, systems, and apparatuses are provided for operating an emergency braking assistant for a motor vehicle. A braking intervention of the emergency braking assistant is activated. The emergency braking assistant is configured to bring the motor vehicle to a standstill automatically via the braking intervention during an imminent collision with an object. An actuation of a brake pedal of the motor vehicle is detected before or during the activated braking intervention. A release of the brake pedal after the detected actuation of the brake pedal and during the activated braking intervention is detected. An actuation of an accelerator pedal is detected after the detected release of the brake pedal. The activated braking intervention is overridden or aborted due to the detected actuation of the accelerator pedal.

9 Claims, 2 Drawing Sheets

(56)                    References Cited

U.S. PATENT DOCUMENTS

| | | | |
|---|---|---|---|
| 2010/0131148 A1* | 5/2010 | Camhi | B60W 40/09 |
| | | | 701/31.4 |
| 2011/0264348 A1 | 10/2011 | Cetinkaya et al. | |
| 2012/0296542 A1 | 11/2012 | Nitz et al. | |
| 2015/0046054 A1 | 2/2015 | Takahashi et al. | |
| 2017/0101107 A1 | 4/2017 | Milch et al. | |
| 2019/0092292 A1* | 3/2019 | Qiao | B60T 8/171 |

FOREIGN PATENT DOCUMENTS

| | | |
|---|---|---|
| DE | 10 2008 042 962 A1 | 4/2010 |
| DE | 10 2010 007 252 A1 | 8/2011 |
| DE | 10 2014 011 858 A1 | 2/2015 |
| DE | 10 2015 219 465 A1 | 4/2017 |
| DE | 10 2021 114 530 A1 | 12/2022 |
| EP | 3 556 628 A1 | 10/2019 |
| JP | 2012-224119 A | 11/2012 |

* cited by examiner

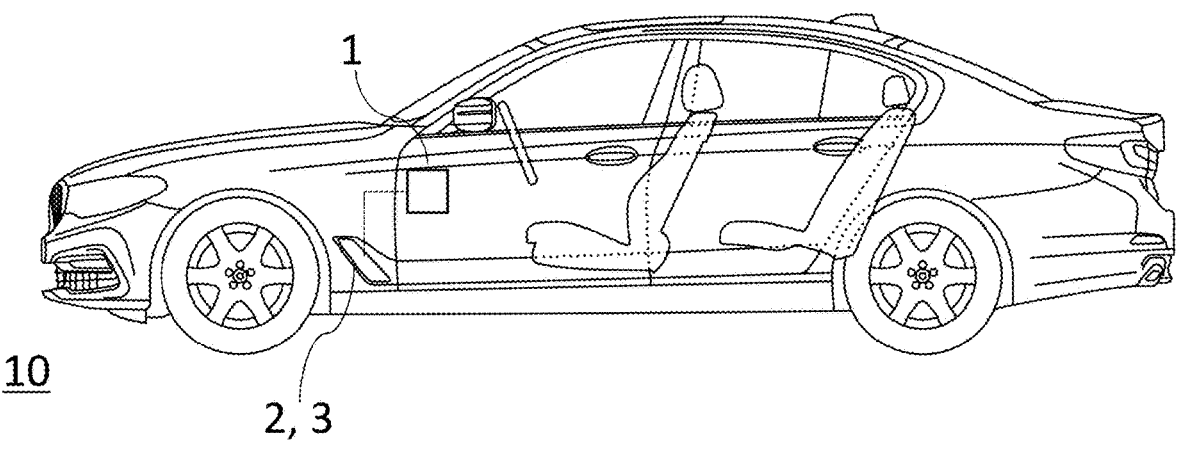

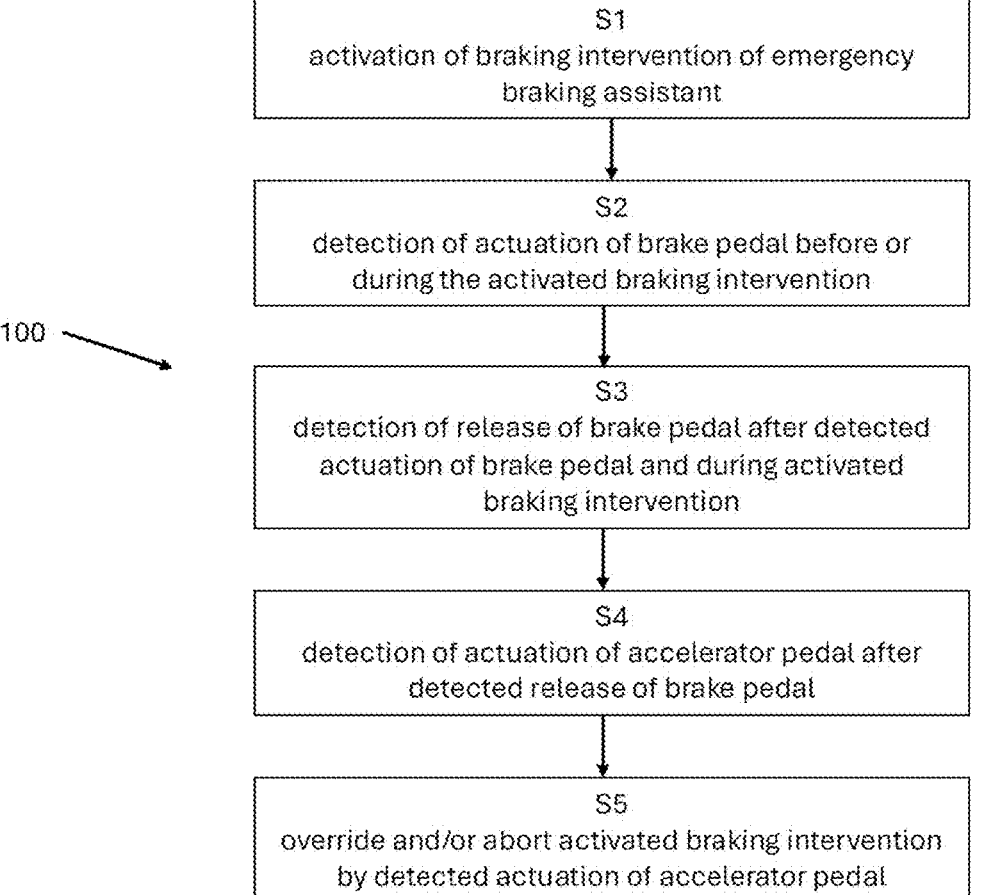

100

S1
activation of braking intervention of emergency braking assistant

S2
detection of actuation of brake pedal before or during the activated braking intervention

S3
detection of release of brake pedal after detected actuation of brake pedal and during activated braking intervention

S4
detection of actuation of accelerator pedal after detected release of brake pedal

S5
override and/or abort activated braking intervention by detected actuation of accelerator pedal

Fig. 2

CONTROL DEVICE AND METHOD FOR OPERATING AN EMERGENCY BRAKING ASSISTANT FOR A MOTOR VEHICLE

CROSS REFERENCE TO RELATED APPLICATION

This application claims priority under 35 U.S.C. § 119 from German Patent Application No. 10 2023 112 655.5, filed May 12, 2023, the entire disclosure of which is herein expressly incorporated by reference.

BACKGROUND AND SUMMARY

The present disclosure relates to a control device for operating an emergency braking assistant for a motor vehicle, a motor vehicle that comprises the control device, and/or a method for operating an emergency braking assistant for a motor vehicle. Additionally, or alternatively, a computer program is provided which comprises commands which, upon the execution of the program by a computer, prompt it to carry out the method at least partially. Additionally, or alternatively, a computer-readable medium is provided which comprises commands which, upon the execution of the commands by a computer, prompt it to carry out the method at least partially.

Driver assistance systems are increasingly being installed in modern motor vehicles, in particular automobiles.

Driver assistance systems ((Advanced) Driver Assistance Systems, (A)DAS) are electronic, in particular mechatronic, equipment in motor vehicles for assisting the driver in specific driving situations. Safety aspects, but also increasing driving comfort, are often at the forefront in this context.

One driver assistance system is the emergency braking assistant (Autonomous Emergency Braking, AEB), which is designed to give a warning if there is a risk of collision and if necessary bring the motor vehicle completely to a standstill before it has a collision with an obstacle, such as a person or a further vehicle. For this purpose, sensors measure the current speed and the distance to the obstacle. Before emergency braking, the emergency braking assistant calculates the most optimum possible braking power and the brake pressure required in this case. Depending on the system, this calculated pressure is implemented independently by the emergency braking assistant in an automatic braking action or is only applied when the brake pedal of the motor vehicle is actuated.

Furthermore, in conventional emergency braking assistants, a braking intervention of the emergency braking assistant can be overridden by a driver of the vehicle at any time by an accelerator pedal interaction (actuating or releasing an accelerator pedal). The driver can thus prevent, for example, unnecessary emergency braking from being carried out in the event of an incorrect function of the emergency braking assistant.

DE 10 2021 114 530 A1 describes a method for operating an emergency braking assistant for a vehicle, wherein the emergency braking assistant is designed to bring the vehicle to a standstill in an automated manner by a braking intervention in the event of an imminent collision with an object. The braking intervention of the emergency braking assistant can be overridden by an accelerator pedal interaction of a driver of the vehicle. The method comprises determining and setting a threshold, which has to be exceeded to override the braking intervention of the emergency braking assistant by the accelerator pedal interaction.

Conventional emergency braking assistants thus invoke leaving the driver responsible as soon as a driver action has been established, wherein an inadvertent override or abort of a braking intervention of the respective emergency braking assistant can still occur, however. The driver interaction which is supposed to result in a desired override or abort of a braking intervention is therefore still in need of improvement in its robustness and reliability.

Against the background of this prior art, the object of the present disclosure is to specify a device and/or a method which are each capable of enhancing the prior art.

The object is achieved by the features of the independent claims. The other independent claims and the dependent claims each contain optional refinements of the disclosure.

The object is accordingly achieved by a control device for operating an emergency braking assistant (Autonomous Emergency Braking, AEB) for a motor vehicle.

The control device is designed to activate a braking intervention of the emergency braking assistant (and optionally to actuate a braking device of the motor vehicle according to the activated braking intervention). The emergency braking assistant is designed to bring the motor vehicle to a standstill due to the braking intervention in an automated manner in the event of an imminent collision with an object.

The control device is designed to detect an actuation of a brake pedal of the motor vehicle before or during the activated braking intervention.

The control device is designed to detect a release of the brake pedal after the detected actuation of the brake pedal and during the activated braking intervention.

The control device is designed to detect an actuation of an accelerator pedal after the detected release of the brake pedal, and to override and/or abort the activated braking intervention due to the detected actuation of the accelerator pedal.

The control device or control unit can be part of the driver assistance system or can represent it. The control device can be, for example, an electronic control unit (ECU). The electronic control unit can be an intelligent processor-controlled unit having a memory that can communicate, for example, via a central gateway (CGW) with other modules and which can form the vehicle onboard network, possibly via field buses, such as the CAN bus, LIN bus, MOST bus, FlexRay and/or via the automotive ethernet, for example, together with telematics control units and/or a surroundings sensor system.

It is conceivable that the control device controls functions relevant for the driving behavior of the motor vehicle, such as the steering, the engine control, the force transmission, and/or the braking system. In addition, driver assistance systems, such as the emergency braking assistant, a parking assistant, an adaptive cruise control (ACC), a lane keeping assistant, a lane change assistant, a traffic sign recognition unit, a light signal recognition unit, a startup assistant, a night vision assistant, and/or an intersection assistant, can be controlled by the control device.

The above-described control device offers an array of advantages. Among other things, the robustness and reliability of the driver interaction which results in a desired override or abort of a braking intervention of the emergency braking assistant is improved in comparison to prior emergency braking assistants. In other words, due to the combination of the brake pedal and accelerator pedal actuation in order to override and/or abort the braking intervention, the risk or the probability that an inadvertent override or an inadvertent abort of the braking intervention is incorrectly triggered is reduced and thus safer operation of the emergency braking assistant is ensured.

Possible refinements of the above-described control device are explained in detail hereinafter.

The control device can be designed to override and/or abort the activated braking intervention due to the detected actuation of the accelerator pedal if the accelerator pedal has been detected within a predetermined time interval (and/or a predetermined detection period) after the detected release of the brake pedal. The condition that the accelerator pedal has been detected within a predetermined time interval after the detected release of the brake pedal can be referred to, for example, as a deceleration request of the emergency braking assistant. The risk or the probability of an inadvertent override or an inadvertent abort of the braking intervention can advantageously be reduced further by this condition.

The control device can be designed to take into consideration a latency time between a first point in time, at which the braking intervention has been activated, and a second point in time, at which braking of the motor vehicle by the activated braking intervention takes place and/or is implemented perceptibly for a driver, in the event of the override and/or abort of the activated braking intervention. The latency time can be less than 1 s, for example, 300 ms.

The control device can be designed to begin a predetermined time interval (and/or a predetermined detection period) as soon as the latency time has ended and the release of the brake pedal has been detected, and to override and/or abort the activated braking intervention due to the detected actuation of the accelerator pedal when the accelerator pedal has been detected within the predetermined time interval.

The control device can be designed to receive a sensor signal of a vehicle sensor system of the motor vehicle when the braking of the motor vehicle by the activated braking intervention is implemented perceptibly for a driver, and to define the second point in time depending on the received sensor signal. The vehicle sensor system can be designed, for example, to detect a (for example abrupt) movement of a driver or an upper body of the driver in the direction of forward travel of the motor vehicle.

The control device can be designed to detect the actuation of the accelerator pedal due to exceeding of a predetermined accelerator pedal angle and/or accelerator pedal gradient (and/or a predetermined deflection) of the accelerator pedal. In other words, the control device can be designed to detect the actuation of the accelerator pedal only when a predetermined accelerator pedal angle and/or accelerator pedal gradient of the accelerator pedal has been exceeded.

The description above may be summarized in other words and in a possible more specific design of the disclosure as described hereinafter, wherein the following description is not to be interpreted as restrictive for the disclosure.

In order to improve the robustness of the driver interaction upon operation of an emergency braking assistant or upon overriding and/or aborting an activated braking intervention of the emergency braking assistant, the brake pedal and accelerator pedal actuation can be combined with one another. Furthermore, a debouncing time can ensure that a driver action has to take place within a specific time so that it is recognized by the system as a reliable driver action.

As a prior condition, a deceleration request of the emergency braking assistant can be applied. It can be determined via a vehicle sensor system from when a requested deceleration will be implemented perceptibly for a driver according to system latencies (typically approximately 300 ms latency). From a point in time from which the deceleration is applied in the motor vehicle and the driver releases the brake pedal, a detection period can begin. If the driver actuates the brake pedal and releases it, an override and/or abort of an activated braking intervention of the emergency braking assistant can only take place if the driver actuates the accelerator pedal within the detection period. An accelerator pedal actuation can be recognized by exceeding an accelerator pedal angle and/or exceeding an accelerator pedal gradient.

Furthermore, a motor vehicle is provided, which comprises the above-described control device.

The motor vehicle can comprise the brake pedal and the accelerator pedal. The brake pedal and the accelerator pedal can be connectable or connected for signaling to the control device.

The motor vehicle can be a passenger vehicle, in particular an automobile, or a utility vehicle, such as a truck.

The motor vehicle can be automated. The motor vehicle can be designed to at least partially and/or at least temporarily take over a longitudinal control and/or a lateral control during automated driving of the motor vehicle by means of the control device.

The automated driving can take place so that the forward movement of the motor vehicle takes place (largely) autonomously. The automated driving can be controlled at least partially and/or temporarily by the control device.

It is conceivable that the motor vehicle intervenes in the lateral control of the motor vehicle by way of a driver assistance system actively, for example, by an adaptation of an actual steering wheel position, and optionally passively, for example, by a display of a turn-off instruction.

The motor vehicle can be a motor vehicle of autonomy level 0, i.e., the driver takes over the dynamic driving task even if assisting systems (such as ABS or ESP) are present.

The motor vehicle can be a motor vehicle of autonomy level 1, i.e., it can have specific driver assistance systems which assist the driver in the vehicle operation, such as adaptive cruise control (ACC).

The motor vehicle can be a motor vehicle of autonomy level 2, i.e., semiautomated so that functions such as automatic parking, lane keeping or lateral control, general longitudinal control, acceleration and/or deceleration are taken over by driver assistance systems.

The motor vehicle can be a motor vehicle of autonomy level 3, i.e., conditionally automated so that the driver does not have to continuously monitor the system of the vehicle. The motor vehicle independently carries out functions such as triggering the turn signal, lane changing, and/or lane keeping. The driver can be employed in other ways but is prompted to take over the control if needed within a pre-warning time by the system.

The motor vehicle can be a motor vehicle of autonomy level 4, i.e., so highly automated that the control of the vehicle is taken over permanently by the system of the vehicle. If the driving tasks are no longer managed by the system, the driver can be prompted to take over the control.

The description above with respect to the control device also applies analogously to the motor vehicle and vice versa.

Furthermore, a method for operating an emergency braking assistant for a motor vehicle is provided.

The method comprises activating a braking intervention of the emergency braking assistant. The emergency braking assistant is designed to bring the motor vehicle to a standstill in an automated manner by way of the braking intervention in the event of an imminent collision with an object.

The method comprises detecting an actuation of a brake pedal of the motor vehicle before or during the activated braking intervention.

The method comprises detecting a release of the brake pedal after the detected actuation of the brake pedal and during the activated braking intervention.

The method comprises detecting an actuation of an accelerator pedal after the detected release of the brake pedal and overriding and/or aborting the activated braking intervention due to the detected actuation of the accelerator pedal.

The control method can be a computer-implemented method, i.e., one, several, or all steps of the method can be carried out at least partially by a computer or a device for data processing, optionally the control device.

The description above with respect to the control device and to the motor vehicle also applies analogously to the method and vice versa.

Furthermore, a computer program is provided, comprising commands which, upon the execution of the program by a computer, prompt it to execute or carry out the above-described method at least partially.

A program code of the computer program can be provided in any code, in particular in a code which is suitable for controllers of motor vehicles.

The description above with respect to the control device, the motor vehicle, and the method also applies analogously to the computer program and vice versa.

Furthermore, a computer-readable medium, in particular a computer-readable storage medium, is provided. The computer-readable medium comprises commands which, upon the execution of the commands by a computer, prompt it to execute or carry out the above-described method at least partially.

That is to say, a computer-readable medium can be provided which comprises an above-defined computer program. The computer-readable medium can be any digital data memory device, such as a USB stick, a hard drive, a CD-ROM, an SD card, or an SSD card (or SSD drive/SSD hard drive).

The computer program does not necessarily have to be stored on such a computer-readable storage medium to be provided to the motor vehicle but can also be acquired externally via the Internet or in another way.

The description above with respect to the method, the control device, the computer program, and the motor vehicle also applies analogously to the computer-readable medium and vice versa.

An optional example is described hereinafter with reference to FIGS. 1, 2, and 3.

Other objects, advantages and novel features of the present invention will become apparent from the following detailed description of one or more preferred examples when considered in conjunction with the accompanying drawings.

BRIEF DESCRIPTION OF THE DRAWINGS

FIG. 1 schematically shows a motor vehicle according to the disclosure having a control device for operating an emergency braking assistant, FIG. 2 schematically shows a flow chart of a method according to the disclosure for operating the emergency braking assistant.

DETAILED DESCRIPTION OF THE DRAWINGS

Figure 3:
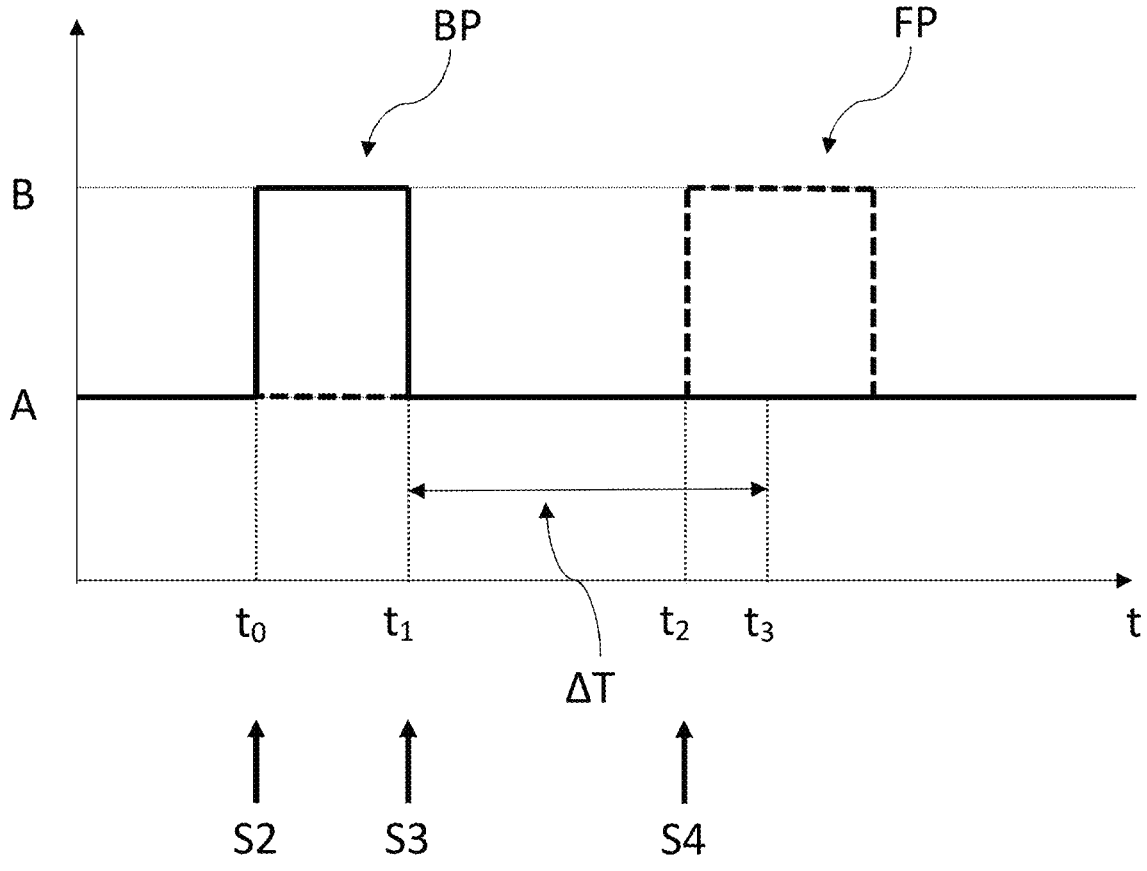
FIG. 3 shows the method by way of example on the basis of actuating curves of the brake pedal and the accelerator pedal.

The motor vehicle 10, which is only shown schematically in FIG. 1, comprises the control device 1, which is designed for operating the emergency braking assistant. The emergency braking assistant is designed to bring the motor vehicle 10 to a standstill in an automated manner by the braking intervention in the event of an imminent collision with an object.

The motor vehicle 10 comprises the brake pedal 2 and the accelerator pedal 3. To be able to detect an actuation or a deflection of the brake pedal 2 and the accelerator pedal 3, the control device 1 is connected for signaling to the two pedals 2, 3.

The motor vehicle 10 furthermore comprises a braking device for decelerating the motor vehicle 10 in driving operation, which can be connected for signaling to the control device 1. It is thus possible to be able to actuate the braking device accordingly in the case of a braking intervention of the emergency braking assistant.

The vehicle 10 can comprise at least one surroundings sensor device for detecting an object in the surroundings of the motor vehicle 10, which can be connected for signaling to the control device 1. The emergency braking assistant operated by the control device 1 can recognize an imminent collision on the basis of sensor data of the at least one surroundings sensor device and a current vehicle speed of the motor vehicle 10, which the control device 1 can receive, for example, from a vehicle onboard network of the motor vehicle 10.

In order to operate the emergency braking assistant, the control device 1 is designed to carry out the method 100 also described in detail hereinafter with reference to FIG. 2.

In a first method step S1, a braking intervention of the emergency braking assistant is activated.

In a second method step S2, an actuation of the brake pedal 2 of the motor vehicle 10 before or during the activated braking intervention is detected. Method step S2 can therefore, for example, also take place before method step S1.

In a third method step S3, a release of the brake pedal 2 after the detected actuation of the brake pedal 2 and during the activated braking intervention is detected. In a fourth method step S4, an actuation of the accelerator pedal 3 after the detected release of the brake pedal 2 is detected. The actuation of the accelerator pedal 3 can first be detected or taken into consideration, for example, when a predetermined accelerator pedal angle and/or accelerator pedal gradient of the accelerator pedal 3 has been exceeded.

In a fifth method step S5, the activated braking intervention is overridden and/or aborted by the detected actuation of the accelerator pedal 3.

This can take place, for example, only when the accelerator pedal 3 has been detected within a predetermined time interval after the detected release of the brake pedal 2.

Furthermore, a latency time between a first point in time at which the braking intervention has been activated and a second point in time at which a braking action of the motor vehicle 10 takes place due to the braking intervention and/or is implemented perceptibly for a driver can be taken into consideration in the event of the override and/or abort of the activated braking intervention. For this purpose, for example, a sensor signal of a vehicle sensor system of the motor vehicle can be received when the braking action of the motor vehicle 10 is implemented perceptibly for a driver by the braking intervention, and the second point in time can be defined depending on the received sensor signal.

The predetermined time interval can begin, for example, as soon as the latency time has ended and the release of the brake pedal 2 has been detected, and the activated braking intervention can be overridden and/or aborted by the detected actuation of the accelerator pedal 3 if the accelerator pedal 3 has been detected within the predetermined time interval.

FIG. 3 shows by way of example the method 100 on the basis of an actuating curve BP of the brake pedal 2 and an actuating curve FP of the accelerator pedal 3.

In the diagram shown, the two actuating curves BP and FP are plotted as a function of time t, wherein the height A indicates a non-actuation and B indicates an actuation of the brake pedal 2 or the accelerator pedal 3.

At the point in time to, the brake pedal 2 is actuated or an actuation of the brake pedal 2 is begun. This can take place independently of the braking intervention of the emergency braking assistant, for example, before the braking intervention has been activated.

At the point in time t1, the brake pedal 2 is released again or the actuation of the brake pedal 2 is ended again, due to which, optionally in consideration of the latency time, the predetermined time interval AT begins. At this point in time t1, the braking intervention of the emergency braking assistant is already activated.

At the point in time t2, the accelerator pedal 3 is actuated or an actuation of the accelerator pedal 3 is begun. Since this point in time t2 is within the predetermined time interval AT which only ends at the point in time t3, the activated braking intervention of the emergency braking assistant is overridden and/or aborted by the detected actuation of the accelerator pedal 3.

The foregoing disclosure has been set forth merely to illustrate the present subject matter and is not intended to be limiting. Since modifications of the disclosed examples incorporating the spirit and substance of the present subject matter may occur to persons skilled in the art, the present subject matter should be construed to include everything within the scope of the appended claims and equivalents thereof.

LIST OF REFERENCE SIGNS

1 control device
2 brake pedal
3 accelerator pedal
10 motor vehicle
100 method
S1-S5 method steps

What is claimed is:

1. A control device for operating an emergency braking assistant for a motor vehicle, the control device comprising:
a processor; and
a memory in communication with the processor and storing instructions executable by the processor to configure the control device to:
activate a braking intervention of the emergency braking assistant, wherein the emergency braking assistant is configured to automatically decelerate the motor vehicle via the braking intervention in the event of an imminent collision with an object;
detect an actuation event of a brake pedal of the motor vehicle before or during the activated braking intervention, wherein the detecting comprises storing an indication that the brake pedal has been actuated;
detect a release event of the brake pedal after the detected actuation event of the brake pedal and during the activated braking intervention, wherein the release event is a distinct event from the actuation event and is detected subsequent to the stored indication of the actuation event while the braking intervention remains active;
detect an actuation of an accelerator pedal after the detected release event of the brake pedal; and
override and/or abort the activated braking intervention due to the detected actuation of the accelerator pedal.

2. The control device according to claim 1, wherein the memory further comprises instructions executable by the processor to further configure the control device to:
override and/or abort the activated braking intervention due to the detected actuation of the accelerator pedal if the accelerator pedal has been detected within a predetermined time interval after the detected release event of the brake pedal.

3. The control device according to claim 1, wherein the memory further comprises instructions executable by the processor to further configure the control device to:
during the override and/or abort of the braking intervention of the emergency braking assistant:
consider a latency time between a first point in time at which the braking intervention has been activated and a second point in time at which braking of the motor vehicle by the activated braking intervention takes place and/or is implemented perceptibly for a driver.

4. The control device according to claim 3, wherein the memory further comprises instructions executable by the processor to further configure the control device to:
begin a predetermined time interval as soon as the latency time has ended and the release of the brake pedal has been detected; and
override and/or abort the activated braking intervention due to the detected actuation of the accelerator pedal if the accelerator pedal has been detected within the predetermined time interval.

5. The control device according to claim 3, wherein the memory further comprises instructions executable by the processor to further configure the control device to:
receive a sensor signal of a vehicle sensor system of the motor vehicle when the braking of the motor vehicle is implemented perceptibly for a driver by the activated braking intervention; and
define the second point in time depending on the received sensor signal.

6. The control device according to claim 1, wherein the memory further comprises instructions executable by the processor to further configure the control device to:
detect the actuation of the accelerator pedal due to exceeding of a predetermined accelerator pedal angle and/or accelerator pedal gradient of the accelerator pedal.

7. A motor vehicle comprising:
the control device of claim 1.

8. A method for operating an emergency braking assistant for a motor vehicle, comprising:
activating a braking intervention of the emergency braking assistant;
automatically decelerating the motor vehicle via the braking intervention in the event of an imminent collision with an object;
detecting an actuation event of a brake pedal of the motor vehicle before or during the activated braking intervention, wherein the detecting comprises storing an indication that the brake pedal has been actuated;
detecting a release event of the brake pedal after the detected actuation of the brake pedal and during the activated braking intervention, wherein the release event is a distinct event from the actuation event and is detected subsequent to the stored indication of the actuation event while the braking intervention remains active;

detecting an actuation of an accelerator pedal after the detected release event of the brake pedal; and overriding and/or aborting the activated braking intervention due to the detected actuation of the accelerator pedal.

9. A non-transitory computer-readable medium comprising instructions operable, when executed by one or more computing systems, to:

activate a braking intervention of an emergency braking assistant of a motor vehicle;

automatically decelerate the motor vehicle via the braking intervention in the event of an imminent collision with an object, wherein the detecting comprises storing an indication that the brake pedal has been actuated;

detect an actuation event of a brake pedal of the motor vehicle before or during the activated braking intervention, wherein the release is a distinct event from the actuation and is detected subsequent to the stored indication of the actuation while the braking intervention remains active;

detect a release event of the brake pedal after the detected actuation event of the brake pedal and during the activated braking intervention, wherein the release event is a distinct event from the actuation event and is detected subsequent to the stored indication of the actuation event while the braking intervention remains active;

detect an actuation of an accelerator pedal after the detected release event of the brake pedal; and override and/or aborting the activated braking intervention due to the detected actuation of the accelerator pedal.

* * * * *